(12) United States Patent
TeGrotenhuis et al.

(10) Patent No.: US 7,051,540 B2
(45) Date of Patent: May 30, 2006

(54) METHODS FOR FLUID SEPARATIONS, AND DEVICES CAPABLE OF SEPARATING FLUIDS

(75) Inventors: Ward E. TeGrotenhuis, Kennewick, WA (US); Victoria S. Stenkamp, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 94 days.

(21) Appl. No.: 10/422,367

(22) Filed: Apr. 23, 2003

(65) Prior Publication Data

US 2006/0032242 A1 Feb. 16, 2006

Related U.S. Application Data

(60) Provisional application No. 60/443,070, filed on Jan. 27, 2003, provisional application No. 60/451,880, filed on Mar. 3, 2003.

(51) Int. Cl.
*F25D 17/06* (2006.01)

(52) U.S. Cl. ........................................................ 62/93
(58) Field of Classification Search ............... 62/89–93
See application file for complete search history.

(56) References Cited

U.S. PATENT DOCUMENTS

| | | | |
|---|---|---|---|
| 3,170,512 A | 2/1965 | Smith | 165/110 |
| 3,289,752 A | 12/1966 | Staub | 165/110 |
| 3,563,727 A | 2/1971 | Algerd et al. | |
| 3,564,819 A | 2/1971 | Neulander et al. | 55/158 |
| 3,587,730 A | 6/1971 | Milton | 165/110 |
| 3,720,044 A | 3/1973 | Grove et al. | |
| 3,837,146 A | 9/1974 | Faure et al. | 55/158 |
| 4,117,079 A | 9/1978 | Bellows | 423/223 |
| 4,187,086 A * | 2/1980 | Walmet et al. | 95/44 |
| 4,239,728 A | 12/1980 | Sternberg et al. | 422/46 |
| 4,715,436 A | 12/1987 | Takahashi et al. | 165/110 |
| 4,770,238 A | 9/1988 | Owen | |
| 4,903,761 A * | 2/1990 | Cima | 165/104.25 |
| 4,999,107 A | 3/1991 | Guerif | 210/224 |
| 5,126,045 A | 6/1992 | Kohlheb et al. | 210/321.85 |
| 5,225,080 A * | 7/1993 | Karbachsch et al. | 210/321.75 |
| 5,281,254 A | 1/1994 | Birbara et al. | 95/44 |
| 5,453,641 A | 9/1995 | Mundinger et al. | 257/714 |
| 5,486,475 A | 1/1996 | Kramer et al. | 435/266 |
| 5,775,410 A * | 7/1998 | Ramm-Schmidt et al. | 165/110 |
| 5,800,595 A | 9/1998 | Wright | 95/288 |
| 5,919,284 A | 7/1999 | Perry, Jr. et al. | 95/286 |
| 6,010,554 A * | 1/2000 | Birmingham et al. | 95/32 |
| 6,126,723 A | 10/2000 | Drost et al. | 96/4 |
| 6,168,647 B1 | 1/2001 | Perry, Jr. et al. | 95/19 |

(Continued)

FOREIGN PATENT DOCUMENTS

FR 2673708 9/1992

(Continued)

OTHER PUBLICATIONS

"Studies on Two-Phase Flows at Normal and Microgravity Conditions," Balaktaiah et al., ISSO-Institute for Space Systems Operations, 1996-1997, retrieved from internet on Mar. 14, 2003.

(Continued)

*Primary Examiner*—Wiliam E. Tapolcai
(74) *Attorney, Agent, or Firm*—Frank Rosenberg; Todd J. Harrington

(57) ABSTRACT

Wick-Containing apparatus capable of separating fluids and methods of separating fluids using wicks are disclosed.

32 Claims, 9 Drawing Sheets

U.S. PATENT DOCUMENTS

| | | | |
|---|---|---|---|
| 6,171,374 B1 | 1/2001 | Barton et al. | 96/7 |
| 6,238,464 B1 | 5/2001 | Dullien | 95/282 |
| 6,258,154 B1 | 7/2001 | Berndt et al. | 96/6 |
| 6,332,913 B1 | 12/2001 | Breitschwerdt et al. | 95/55 |
| 6,503,298 B1 | 1/2003 | Monzyk et al. | 95/96 |
| 6,666,909 B1 | 12/2003 | TeGrotenhuis et al. | 95/273 |
| 2001/0042716 A1 | 11/2001 | Iversen et al. | 210/640 |
| 2002/0144600 A1 | 10/2002 | TeGrotenhuis et al. | 95/273 |
| 2003/0033932 A1 | 2/2003 | Sirkar et al. | 95/51 |

FOREIGN PATENT DOCUMENTS

| | | |
|---|---|---|
| GB | 1178264 | 1/1970 |
| WO | WO 98/58743 | 12/1998 |

OTHER PUBLICATIONS

PCT Search Report, mailed Jan. 26, 2004, PCT/US2004/002254.

WO 01/93976A2 with international search report.

TeGrotenhuis et al., "Testing of Microchannel Partial Condenser and Phase Separator in Reduced Gravity," First International Conference on Microchannels and Minichannels, Rochester, NY (Apr. 24-25, 2003).

Vasiliev et al., "High Efficient Condenser with Porous Element," SAE Technical Paper Series, 21st Int'l Conf. On Environmental Systems (1991).

Dean, "Zero Gravity Phase Separator Technologies," Technical Paper Series, 22nd Int'l Conf. On Environmental Systems (1992).

Muraoka, "Experimental and Theoretical Investigation of a Capiallary Pumped Loop with a Porous Element in the Condenser," Int. Comm. Heat Mass Transfer, vol. 25, pp1085-1094 (1998).

* cited by examiner

METHODS FOR FLUID SEPARATIONS, AND DEVICES CAPABLE OF SEPARATING FLUIDS

RELATED APPLICATIONS

In accordance with 35 U.S.C. sect. 119(e), this application claims priority to U.S. Provisional Application Nos. 60/443,070, filed Jan. 27, 2003, and 60/451,880, filed Mar. 3, 2003.

This invention was made with Government support under Contract DE-AC0676RLO1830 awarded by the U.S. Department of Energy. The Government has certain rights in the invention.

FIELD OF THE INVENTION

The present invention relates to methods of separating fluids. The invention also relates to devices that are capable of separating fluids.

INTRODUCTION

Condensation and phase separation are important unit operations in many processes, including space applications, such as water management in environmental life support systems and space suits (Lange and Lin, 1998). As another example, fuel processors for fuel cells that convert a liquid hydrocarbon to hydrogen rich gas for fuel cells, are heavy consumers of water (Flynn, et al., 1999), although net water is produced when coupled to a fuel cell. The ability to recover and recycle water is critical in fuel cell systems to reduce the mass of consumables, particularly in transportation and portable applications. For both of these applications, size and weight of the hardware are critical considerations. Furthermore, the ability to cool with a gas rather than a liquid is a significant advantage. A third application for compact condensers is in portable cooling systems for soldiers and emergency workers.

Channels having a minimum dimension between 100 microns and a few millimeters can be used to accomplish phase separation in compact devices (Wegeng, et al., 2001). Furthermore, hydrodynamic and capillary forces have been shown to dominate over gravitational forces (TeGrotenhuis and Stenkamp, 2001), making these devices operable independent of gravity and of orientation. Several other technologies have been developed for phase separation in the absence of gravity, many of which are rotary or vortex devices (Dean, 1991).

The development of compact heat exchangers is a well-established field (Kays and London, 1984, Webb, 1994), generating many techniques for enhancing heat exchange by reducing hydraulic diameter, adding extended surfaces, and inducing mixing.

SUMMARY OF THE INVENTION

In a first aspect, the invention provides a condenser comprising the following elements in the order listed: a first cooling channel; a first gas flow channel adjacent to the first cooling channel; a liquid flow path comprising a wick; a second gas flow channel; and a second cooling channel adjacent to the second gas flow channel.

The invention also provides a process of separating fluids in which a fluid mixture passes into the first gas flow channel of the condenser of the first aspect.

In another aspect, the invention provides a condenser, that includes: a cooling channel; a gas flow channel adjacent to the cooling channel; and a liquid flow path comprising a wick; wherein the liquid flow path is adjacent to the gas flow channel. The cooling channel is defined by cooling channel walls. This condenser possesses high energy density steady-state performance such that, when ambient air at 20° C. is passed through the cooling channel at a superficial velocity of 840 cm/s and a feed stream containing 40.0 mol % water vapor in air is passed through the gas flow channel at a superficial velocity of 1700 cm/s at the entrance, the decrease in pressure of the ambient air stream through the cooling channel is no more than 4 inches (10 cm) of water column, and at least one of the following is obtained: (1) the energy density, as calculated from the volume of the sum of the cooling channel and the gas flow channel, including the volume of walls defining the cooling channel, is at least 2.0 W/cm$^3$, or (2) the specific energy, as calculated from the weight of the materials defining the cooling channel and the gas flow channel, is at least 1000 W/kg, or (3) the overall mean heat transfer coefficient is at least 500 W/cm$^2$·K based on the primary heat transfer area between the gas flow channel and the cooling channel, or (4) at least 70% of the water vapor in the feed stream condenses into a liquid. The properties that characterize the condenser are to be measured at steady-state.

In a further aspect, the invention provides a method of condensing water, comprising: passing a fluid mixture comprising water vapor into a gas flow channel in a condenser, forming a liquid in a liquid flow path; and passing ambient air through a cooling channel with a pressure drop through the cooling channel of no more than 4 inches (10 cm) of water column. The condenser comprises: a cooling channel defined by cooling channel walls; a gas flow channel adjacent to the cooling channel; and a liquid flow path that is adjacent to the gas flow channel. There is a primary heat transfer surface between the gas flow channel and the cooling channel. This method is further characterized by at least one of the following: (1) the energy density, calculated from the volume of the sum of the cooling channel and the gas flow channel, including the volume of walls defining the cooling channel, is at least 2.0 W/cm$^3$, or (2) the specific energy, calculated from the weight of the materials defining the cooling channel and the gas flow channel, is at least 1000 W/kg, or (3) the overall mean heat transfer coefficient is at least 500 W/cm$^2$·K based on the primary heat transfer area between the gas flow channel and the cooling channel, or (4) at least 70% of the water vapor in the feed stream condenses into a liquid.

Properties and experimental results are disclosed in the description of preferred embodiments and Examples sections. Processes and apparatus of the invention can, alternatively or additionally, be characterized by the properties and results described. For example, methods of the present invention can be described in terms of pore throat utilization, heat flux, heat transfer coefficient, and energy density or specific power as a function of water vapor in the feed stream. Similarly, the inventive apparatus can be described as being characterizable by values of pore throat utilization, heat flux, heat transfer coefficient, and energy density or specific power as a function of water vapor in the feed stream, if tested according to the conditions described in the Examples.

The invention also provides systems that incorporate any of the condensers described herein. For example, the invention includes systems in which a condenser is connected to the outlet of a fuel cell, combustor (preferably a microchannel combustor), or fuel processor (such as a steam reforming unit). Likewise, some methods of the present invention perform the functions of these systems; for example, recovery of liquid water from the effluent of a fuel cell, or recovery of water from a combustion reaction, or recovery of water from a fuel processor.

In some preferred embodiments, any of the condensers, methods, and systems described herein are gravity independent.

The invention, in various aspects and embodiments can provide numerous advantages including: rapid mass transport, high rates of heat transfer, low cost, durability, highly efficient gas-liquid and fluid separations in a compact space, low profile equipment, and unit process operations that function in the absence of gravity, such as in extraterrestrial applications. The invention can also be advantageous in applications where flow rates are small or where size matters, examples include: analytical systems, biological applications, waste stream purification, recovery and recycling such as urine in space applications.

GLOSSARY OF TERMS

"Breakthrough pressure" is the maximum pressure difference that can be maintained across a porous structure without having a wetting fluid displaced from the porous structure by a second fluid.

A "capture structure" is a structure disposed (at least partly) within a gas flow channel that assists movement of a liquid into the wick.

"Device volume" refers to the entire volume of the device, including channels, headers, and shims.

"Flow microchannel" refers to a microchannel through which a fluid flows during normal operation of an apparatus.

A "fluid mixture" comprises at least two components, one of which will (at least partially) form a liquid phase in a liquid flow path. Typically, a fluid mixture contains a condensable component (such as gaseous water) and a noncondensable component (such as $N_2$); however, a fluid mixture could also be comprised of a gas (such as $N_2$) and suspended liquid droplets (such as water droplets).

A "gas flow channel" may or may not contain a capture structure. In any case, a gas flow channel contains less wicking material than in an adjacent liquid flow path so that a liquid will preferentially migrate to the liquid flow path.

A device, or method, that is "gravity independent" or "orientation independent" functions well in the absence of gravity or in any orientation with respect to a gravitational field. Motivating liquid flow via capillary forces can enable this mode of operation.

A "laminated device" is a device having at least two nonidentical layers, wherein these at least two nonidentical layers can perform a unit operation, such as heat transfer, condensation, etc., and where each of the two nonidentical layers are capable having a fluid flow through the layer. In the present invention, a laminated device is not a bundle of fibers in a fluid medium.

A "liquid" is a substance that is in the liquid phase within the wick under the relevant operating conditions.

A "liquid flow path" is a wick (or wicks) or open channel (or channels) or pore throat (or pore throats) or a combination of wicks, pore throats, and open channels through which a liquid flows during operation of a device.

"Microchannel" refers to a channel having at least one dimension of 5 mm or less. The length of a microchannel is defined as the furthest direction a fluid could flow, during normal operation, before hitting a wall. The width and depth are perpendicular to length, and to each other, and, in the illustrated embodiments, width is measured in the plane of a shim or layer.

"Microcomponent" is a component that, during operation, is part of a unit process operation and has a dimension that is 1 mm or less.

"Pore throat" refers to a porous structure having a maximum pore dimension such that a non-wetting fluid is restricted from displacing a wetting fluid contained with the pore throat under normal operating conditions.

"Residence time" refers to the time that a fluid occupies a given working volume.

"Superficial velocity" is calculated as the volumetric flow rate of a fluid divided by the total flow area available to the flowing fluid.

"Unit process operation" refers to an operation in which the chemical or physical properties of a fluid stream are modified. Unit process operations (also called unit operations) may include modifications in a fluid stream's temperature, pressure or composition.

A "wicking region" is the volume occupied by a wick, or, a wicking surface such as a grooved microchannel surface.

"Working volume" refers to the total channel volume of the device, and excludes the headers and solid shim and end plate materials.

DESCRIPTION OF PREFERRED EMBODIMENTS OF THE INVENTION

General features of laminated, capillary-driven fluid separation devices and preferred operating conditions are disclosed in U.S. Published Patent Application 20020144600 A1, which is incorporated herein by reference as if reproduced in full below.

Figure 1:
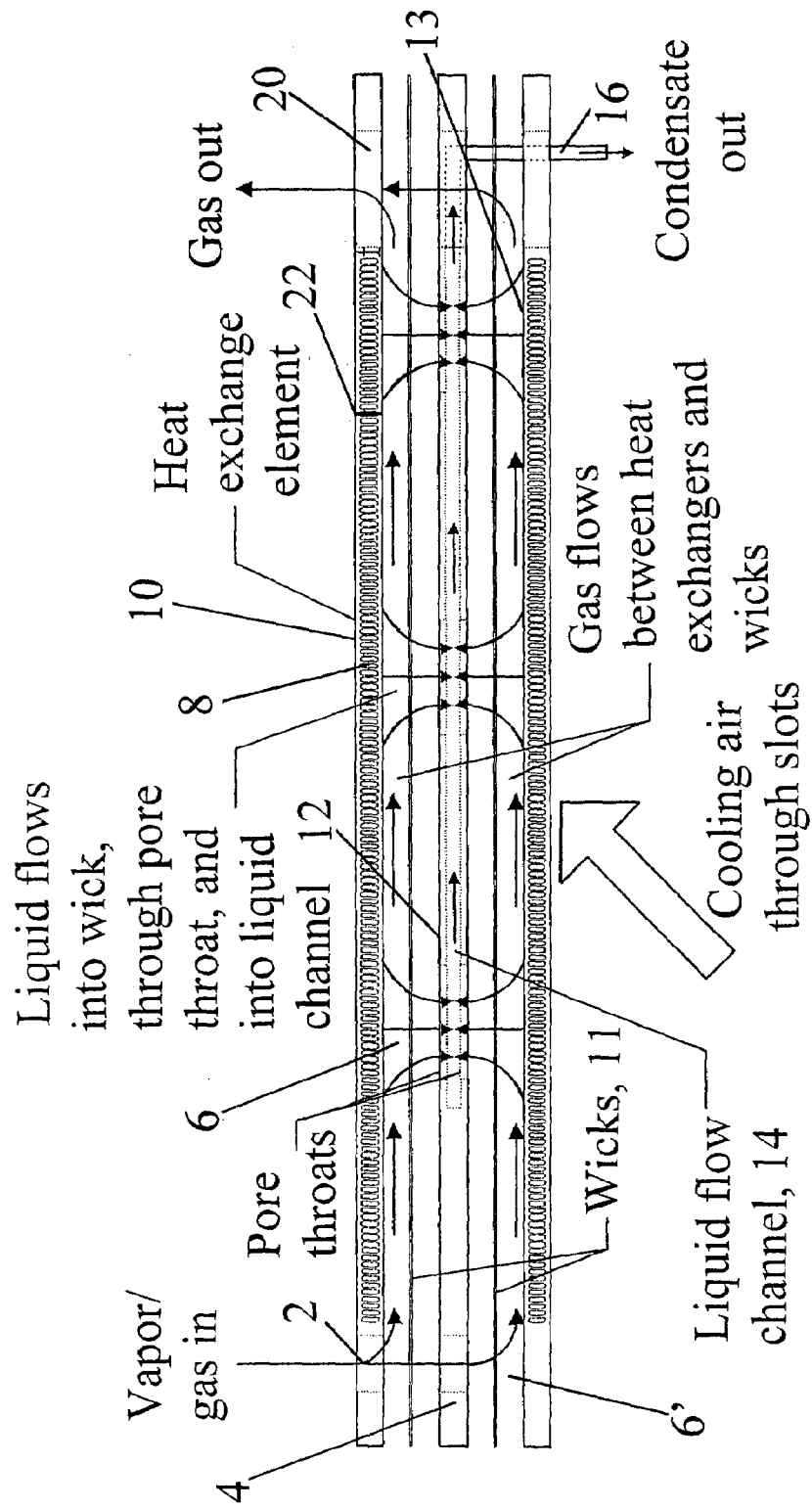
FIG. 1 is a Schematic illustration of an exploded, cross-sectional view of a phase separator.

A cross-sectional, schematic view of a condenser is shown in FIG. 1. During operation, a fluid mixture passes in through fluid inlet 2 into header 4 where it is distributed into gas flow channels 6 and 6'. Coolant passes through elongated coolant slots 8 in cooling channel layer 10. The material surrounding the coolant slots are the cooling channel walls. As the fluid mixture passes through the gas flow channels, heat from the fluid is removed through primary heat exchange surface 13 (this surface also is an exterior surface of a cooling channel wall) and a liquid condenses from the fluid mixture, flows into wick 11, through optional pore throat 12 and into liquid flow channel 14. The figure is an exploded view and shows a separation between the wick and the pore throat; however, in typical operation the optional pore throat should contact the wick. The device can work under the influence of gravity, but, more typically, suction is applied to pull liquid out through liquid outlet 16. In a device with multiple liquid flow channels, an optional footer (not shown) may carry flow from multiple liquid flow channels. Gas from the gas flow channels may pass through an optional gas footer and out through gas outlet 20.

While the device in FIG. 1 shows only one configuration, it should be appreciated that numerous variations come within the purview of the invention; for example, there may be multiple gas outlets, there may be pore throat in the gas outlet, etc. In the illustrated device, the coolant slots 8 extend to the gas outlet; however, in preferred embodiments, the coolant slots (or, more generally, the flow paths for coolant) do not extend to the gas outlet, but end at a point 22 prior to the outlet. This configuration can reduce condensation near the gas outlet and thus reduce the risk of liquid breakthrough to the gas outlet. In some preferred embodiments, the coolant flow path ends at a distance away from the gas outlet that is at least 10% of the length of the adjacent gas flow channel 6.

In preferred embodiments, the condenser is a laminated device made by stacking thin plates. Such a device may be plumbed similarly to the laminated constructions described in U.S. Published Patent Application 20020144600 A1.

In the devices of the present invention, the primary heat transfer surfaces are the walls between the heat exchangers and the gas flow channels. Walls between channels in the heat exchanger can act as heat exchange fins, and thus provide extended heat transfer surface area. Walls within the heat exchanger can also provide structural support. The optimal aspect ratio for the heat exchanger channels and the thickness of the walls within a heat exchanger that are between the heat exchanger channels depend on the thermal conductivity of the material and the convective heat transfer coefficient on the coolant side. In some preferred embodiments, channels for fluid flow in the heat exchanger have a wall thickness between slots of less than 20 μm, and preferably, a channel width of 15 to 50 μm, and a preferred ratio of channel height (a direction perpendicular to flow; in a laminated device, the stacking direction) to channel width (the dimension perpendicular to height and flow) of at least 2, more preferably at least 4.

Coolant fluid flowing through the coolant channels can be a liquid (for example, water) or a gas. In some embodiments, a fan or blower moves gas through the cooling channels. In some preferred applications of the present invention, it is desired to use a gas as the heat exchange fluid. In this case, the majority of the heat transfer resistance can be in the heat exchange channel. Furthermore, the application may be sensitive to the pressure drop of the heat exchange fluid. One example is water recovery from multiple streams in an automotive fuel processor for generating a hydrogen rich gas stream for use in a fuel cell. Ambient airflow provided by a blower or fan would be the most convenient heat exchange fluid. In this case, the pressure head provided by the blower or fan would be limited. For applications such as these, a configuration with extended heat transfer surface in the heat exchange channels is preferred.

The presence of wicks and optional pore throats and optional capture structures are common to multiple embodiments of the invention. A wick is a material that will preferentially retain a wetting fluid by capillary forces and through which there are multiple continuous channels through which liquids may travel by capillary flow. The channels can be regularly or irregularly shaped. Liquid will migrate through a dry wick, while liquid in a liquid-containing wick can be transported by applying a pressure differential, such as suction, to a part or parts of the wick. The capillary pore size in the wick can be selected based on the contact angle of the liquid and the intended pressure gradient in the device, and the surface tension of the liquid. Preferably, the pressure differential across the wick during operation should be less than the breakthrough pressure— the point at which gas will intrude into the wick displacing the liquid—this will exclude gas from the wick.

A liquid preferentially resides in the wick due to surface forces, i.e. wettability, and is held there by interfacial tension. Flooding can result from exceeding the flow capacity of the device for wetting phase through the wick; the flow capacity is determined by the fluid properties, the pore structure of the wick, the cross-sectional area for flow, and the pressure drop in the wick in the direction of flow.

The wick can be made of different materials depending on the liquid that is intended to be transported through the wick. The wick could be a uniform material, a mixture of materials, a composite material, or a gradient material. For example, the wick could be graded by pore size or wettability to help drain liquid in a desired direction. Examples of wick materials suitable for use in the invention include: sintered metals, metal screens, metal foams, polymer fibers including cellulosic fibers, or other wetting, porous materials. The capillary pore sizes in the wick materials are preferably in the range of 10 nm to 1 mm, more preferably 100 nm to 0.1 mm, where these sizes are the largest pore diameters in the cross-section of a wick observed by scanning electron microscopy (SEM). In some preferred embodiments, the wick is, or includes, a microchannel structure. Liquid in the microchannels migrates by capillary flow. The microchannels can be of any length, preferably the microchannels have a depth of 1 to 1000 micrometers (μm), more preferably 10 to 500 μm. Preferably the microchannels have a width of 1 to 1000 μm, more preferably 10 to 100 μm. In a preferred embodiment, the microchannels are microgrooves, that is, microchannels having a constant or decreasing width from the top to the bottom of the groove. In another embodiment, the microchannels form the mouth to a larger diameter pore for liquid transport.

For wicking materials, the objective is to provide materials that have high permeability and small pore structure, in order to obtain high flow rates while also supporting a significant pressure drop down the wick (the maximum pressure drop decreases with increasing pore size). For devices where liquid phase mass transfer limits processing throughput, the thinness of the wick material is also critical for process intensification. Preferably the thickness of a wick is less than 500 micrometers (μm), more preferably less than 100 μm, and in some embodiments between 50 and 150 μm.

In operation of a device with a wick, the wick should not be flooded, and it is preferably not dry. A wet or saturated wick will effectively transport liquid through capillary to a low pressure zone, such as low pressure created by suction. A pore throat may be added to a liquid outlet to prevent gas flow out of the liquid exit.

Punctured and punctured/expanded foils provide superior results when used as wicks and/or capture structures in fluid separation apparatus. Particularly preferred foils are UltraThin MicroGrid Precision-Expanded Foils, available from Delker Corporation. These materials are made in a flattened form and a 3-dimensional expanded form. Although similar to conventional wire mesh screens, these materials are made from a single thin sheet by punching an array of hole while pulling the material. In the flattened form the holes are an array of diamonds. In the expanded form, the filaments are in a regular tetrahedral configuration.

Both the flat and expanded foils have been tested for wicking properties as single sheets, in multiple stacked sheets, and with or without a solid backing sheet. In general, the wicking properties are much superior to other materials tested (except for Fresnel lenses, discussed below), including conventional woven screens. Qualitatively, the Delker foils appear to have an order of magnitude higher wicking rate than any other regular or random porous structure tested. In addition, the Delker materials can be made in a wide variety of thickness as small as 0.0015 inch (1.5 mil) and from a variety of metals, including copper, aluminum, and nickel.

Fresnel lenses are another preferred form of wick. Wicks having microchannels having depths of less that 100 μm, preferably 50 to 100 μm promote rapid mass transfer.

A wick can also be prepared by laser machining grooves into a ceramic tape in the green state. Such wicks can be made, for example, with grooves less than 50 microns deep with openings less than 100 microns wide. These grooves are expected to have a rectangular shape. Ceramic wicks have a high surface energy, are chemically inert, and have high temperature stability. Another material option is intermetallics formed from two or more metals placed in intimate contact during a bonding process and which combine to form an alloy, compound, or metal solution. Preferred intermetallics will have properties very similar to the ceramic materials. An advantage of engineered structures is fine control of the length-scale for mass transfer in the liquid phase, which is desirable for mass transfer limited applications, such as gas absorption and distillation.

In preferred embodiments, a wicking/pore throat structure provides a flow path for a separated liquid phase. Two mechanisms are desirable for optimal device operation, a wicking mechanism and a mechanism for excluding gas. The wicking mechanism is accomplished by a porous structure that is wetting for the liquid in order to cause preferential sorption, while having high permeability to provide flow capacity to the outlet. The second mechanism prevents intrusion by the gas stream into the liquid outlet channel, and can be accomplished using a pore throat. The bubble point of the pore throat, as dictated by the maximum pore size, contact angle, and surface tension of the liquid, determines the maximum allowable pressure differential between the gas and liquid outlets. The wick and the pore throat can be embodied in the same component or structure if a suitable structure is available having a high enough wicking flow capacity and small enough pores to give a high enough bubble point. In devices having both a wick and a pore throat, the pore throat has a relatively greater resistance to fluid flow.

The wick is preferably not permitted to dry out during operation since this could result in gas escaping through the wick. One approach for avoiding dryout is to add a flow restrictor in capillary contact with the wick structure, such as a porous structure with a smaller pore size than the wick structure and limiting the magnitude of the suction pressure such that the non-wetting phase(s) cannot displace the wetting phase from the flow restrictor. This type of restrictor is also known as a pore throat. In preferred embodiments, a pore throat is provided between the wick and the liquid flow channel and/or at the liquid outlet. In some embodiments, the wick can have a small pore diameter such that serves to transport fluids from the gas channel and also prevents gas intrusion, thus serving the dual purpose of a wick and a pore throat.

A pore throat has a bubble point that is greater than the maximum pressure difference across the pore throat during operation. This precludes intrusion of gas into the pore throat due to capillary forces (surface tension, wettability, and contact angle dependent). The pore throat should seal the liquid exit, so there should be a seal around the pore throat or the pore throat should cover the exit in order to prevent gas from bypassing the pore throat. The pore throat is preferably very thin to maximize liquid flow through the pore throat at a give pressure drop across the pore throat. In some embodiments, the pore throat has a pore size that is less than half that of the wick and a thickness of 50% or less than the wick's thickness; and in some of these embodiments the pore throat has a pore size that is 20% or less that of the wick. Preferably, the pore throat is in capillary contact with the wicking material to prevent gas from being trapped between the wick and the pore throat and blocking the exit.

A capture structure can be inserted (at least partly) within the gas flow channel, and in liquid contact with the wick. The capture structure assists in removing (capturing) a liquid from the gas stream. One example of a capture structure are cones that protrude from the wick; liquid can condense on the cones and migrate into the wick—an example of this capture structure is shown in U.S. Pat. No. 3,289,752, incorporated herein by reference. Other capture structures include inverted cones, a liquid-nonwetting porous structure having a pore size gradient with pore sizes getting larger toward the wick, a liquid-wetting porous structure having a pore size gradient with pore sizes getting smaller toward the wick and fibers such as found in commercial demisters or filter media. Mechanisms for capturing dispersed liquid particles include impingement (due to flow around obstructions), Brownian capture (long residence time in high surface area structure), gravity, centrifugal forces (high curvature in flow), or incorporating fields, such as electrical or sonic fields, to induce aerosol particle motion relative to the flow field.

Capture structures can also be useful as a structural element. A wire mesh screen can be placed in the gas channel above a pore throat, so that if a device is bolted together, the screen provides a force against the pore throat such that it seals against the rubber gasket on the back side and also creates a seal between the rubber gasket and the opposite wall. One means of assembling a multi-channel microchannel device is to create a sandwich of alternating layers with gaskets providing seals. In this situation, a capture structure in the gas channels could be compressed to generate forces through the entire stack, thereby providing for the necessary seals.

Another use for a capture structure is to enhance heat transfer. If the capture structure has a high thermal conductivity, it can act as an extended surface for heat transfer. This is advantageous where heat transfer is important, such as in condensation of at least some part of a gas stream being cooled. By being in thermal contact with the primary heat transfer area, the capture structure promotes heat removal from the flowing gas stream, which is then conducted to the primary area and subsequently to the heat transfer fluid. In addition, condensation can occur on the capture structure, and the heat of condensation can also conduct through the capture structure.

A further use for perforated foils in the expanded form (tetrahedrally configured filaments) is as capture structures. Low flow resistance is a desirable attribute of a capture structure, and the open, regular structure of Delker expanded screens (such as 10 AL 16-125 P and 5 Cu 14-125 P) has low pressure drop for convective flow. The Delker foils can have one to two orders of magnitude higher permeability than conventional woven screens. In addition, the aluminum, copper, and other metal forms have relatively high thermal conductivity and also enhance heat transfer. Thus, tetrahedrally configured filaments provide a significant advantage as capture structures.

A factor that may limit the throughput of the devices is the flow capacity of the wicking and pore throat structure. This porous structure is characterized by a permeability coefficient defined as, $$K = \frac{\mu_L h Q}{A \Delta P} \quad (1)$$

where Q is the volumetric flow of fluid through the cross-sectional area A, of a porous media of thickness h, under an applied pressure drop of ΔP. The pore throat maximum liquid flow capacity, $Q_{pt}$, is then calculated for a given experiment from the viscosity of the liquid and the pressure difference across the pore throat structure. Device performance can then be characterized by the volumetric flow of recovered liquid as a percentage of the pore throat maximum flow capacity. Preferably, in the present invention, the volumetric flow of recovered liquid as a percentage of the pore throat maximum flow capacity is no more than 30%, more preferably no more than 10%.

Another potential limiting factor is intrusion of gas into the pore throat, which can occur at the bubble point of the pore throat, which is calculated from the Young-Laplace equation, $$\Delta P_{max} = \frac{2\sigma \cos(\theta)}{r_p} \quad (2)$$

where θ is the receding contact angle (meaning as the liquid is receding across the pore throat material) between the liquid and the pore throat and rp is the maximum pore radius.

Since the wall separating the coolant flow channel from the gas flow channel is the primary heat transfer surface, it may be advantageous to provide a structure to aid the flow of liquid from the primary heat transfer surface to a wick in the liquid flow path. A capture structure or other transport structure can be used to provide a flow path to the liquid flow channel. A "transport structure" extends from the liquid flow path into the gas flow channel to either (1) the primary heat transfer surface, or (2) to a point near the primary heat transfer surface such that a liquid condensed on the primary heat transfer surface can flow along the structure into the liquid flow path.

In a device with an essentially planar gas flow channel, liquid condensed on the primary heat transfer surface will be pushed to the sides of the gas flow channel under certain flow conditions (see the discussion of Suratmann number in U.S. Published Patent Application 20020144600 A1) where the liquid then comes in contact with and flows into a wick in the liquid flow path. In some preferred embodiments, the distance between the primary heat transfer surface and a wick in a liquid flow path is 5 mm or less, more preferably 2 mm or less. In some embodiments, the areas for heat transfer and wick surface area are balanced such that the area of the primary heat transfer surface is within 25% of the geometric surface area of the wick that is on the opposite side of the gas flow channel. In preferred embodiments, liquid breakthrough out the end of a gas flow channel is reduced or prevented by limiting the area for cooling; thus, in some preferred embodiments, the coolant flow paths (the volume of a cooling channel layer that carries coolant) do not extend to the end of the gas flow channel, in some preferred embodiments, the coolant flow paths are not adjacent to at least 10% (in some embodiments 20%) of the length gas flow channel that is nearest a gas outlet that is connected to the gas flow channel.

Another optional feature is reduced or non-wettability of the gas flow channel wall adjacent to a heat exchange surface to preclude formation of a liquid film. This could be accomplished, for example, by making this wall of, or coating the wall with, a material that has a reduced or non-wettability for the condensed phase (e.g., a hydrophobic material where water is the condensed phase). The heat transfer coefficient would increase substantially by avoiding the resistance of a liquid film.

The height of the gas flow channels 6, from surface 13 to wick surface 11 is preferably about 10 μm to 5 mm, more preferably 100 μm to 1 mm. The height of the channels is preferably small for good heat and mass transfer and overall device size, balanced against potentially slower flow rates or higher pressure drops. A high ratio of surface area of exposed wick to volume of gas flow channel is desirable for efficient phase separations. Preferably this ratio is from 1 to 1000 $cm^2$:$cm^3$, and in some embodiments from 5 to 10. In some preferred embodiments, the gas flow channels are substantially the same length and the liquid flow channel(s) is at least 10% shorter than the gas flow channels.

The illustrated embodiments show cross-flow heat exchange to provide for shorter coolant flow path and less coolant stream pressure drop; however, in some preferred embodiments, the flow through the heat exchanger is rotated 90° (so that the heat exchange fluid flows in the direction opposite net fluid flow in the gas flow channels) to obtain counter-current flow and higher heat transfer effectiveness. As in all the devices described herein, the shims can be repeated for numerous layers, and, in some embodiments, the devices include 2 to 1000, or at least 4, repeating heat exchange units, where the repeating unit includes shims for fluid separation (including a wick and capability for fluid transport) and heat exchange.

In some preferred embodiments there are multiple gas flow channels operating in parallel. This configuration allows high throughput and provides a large surface area to volume ratio for high efficiency. In some preferred embodiments, layers are stacked to have between 2 and 600 separate gas flow channels, more preferably at least 3 gas flow channels, and in some embodiments, between 3 and 40 gas flow channels. As an alternative to the parallel arrangement, the channels could be connected in series to create a longer flow path.

In some preferred embodiments, net flow of coolant through the coolant flow path is cross-flow with respect to the net flow of gas through the gas flow channel; in this configuration, the length of the gas flow channel (in the direction of net flow of gas) is preferably at least 2 times, in some embodiments at least 5 times, longer than the length (in the direction of net flow of coolant) of the coolant channels. This configuration can achieve a low pressure drop. Regardless of whether there is cross-flow, in some preferred embodiments, pressure drop through a coolant channel (meaning from the beginning to end of a coolant channel) is 4 inches (10 cm) of water column or less, and in some embodiments, 2 inches (5 cm) of water column or less.

Another advantage of some preferred embodiments of the invention is that the gas flow channels and/or liquid flow channels can be essentially planar in the fluid separation regions. This configuration enables highly rapid and uniform rates of mass and heat transport. In some preferred embodiments, the gas flow channels and/or liquid flow channels have dimensions of width and length that are at least 10 times larger than the dimension of height (which is perpendicular to net gas flow). In especially preferred embodiments, the devices are made by stacking planar shims (plates) and bonding the stacked shims. Preferably, the shims are less than 1 cm thick, more preferably less than 5 mm thick.

The effectiveness at preventing breakthrough of liquid into the gas outlet is sensitive to two dimensionless parameters, the ratio of the gas and liquid Reynolds number and the Suratmann number. The Reynolds number for both phases is calculated based on the space velocity for the single phase. The Suratmann number is defined as $Su = \sigma D_h \rho_L / \mu_L$ with $\sigma$ being the gas-liquid interfacial tension, $D_h$ being the hydraulic diameter, $P_L$ the liquid phase density, and $\mu_L$ the liquid phase viscosity. These two parameters have been identified in the literature as indicating where the transition from annular to slug flow occurs in pipe flow in microgravity, see Jayawardena, S., V. Balakotaiah, and L. C. Witte, "Flow Pattern Transition Maps for Microgravity Two-Phase Flows", AIChE J., 43(6), 1637–1640, 1997. The device would operate better in the annular flow regime than in a slug flow regime, because in annular flow the liquid would be forced to the corners and walls where it could then drain from the gas channel into the wick structure. Conditions in the gas flow channel(s) are preferably maintained such that $Re_{GS}/Re_{LS}$ is greater than about $(4500) \cdot (Su)^{-0.67}$; and in some embodiments, the range of $Re_{GS}/Re_{LS}$ is in the range of $(4600 \text{ to } 10,0000) \cdot (Su)^{-0.67}$.

In a preferred embodiment, the gas phase is contiguously connected to the gas outlet and the liquid phase is contiguously connected from the liquid flow path to the liquid outlet. The continuity of phases at the gas outlet is effected by the geometry, the total flow and ratio of gas to liquid flow, and the fluid physical properties, as reflected by the dependence on $Re_{GS}/Re_{LS}$ and the Suratmann number described above. A second desired condition is sufficient wicking capacity, which is influenced by the flow area, fluid physical properties, and the permeability of the material.

An inverse relationship has been discovered between the requirement for excess flow capacity in the wick and the establishment of continuous phases in the gas flow channel. For a given gas and liquid flow rate, the size of the channel and the number of channels can be designed to achieve continuous phases (annular or stratified, as examples) in the flow in the channels as determined by the flow rates, the geometry, and the physical properties of the fluids, including consideration of the ratio of the Reynolds number and the value of the Suratmann number, while maximizing the throughput of the device.

In some preferred embodiments, the inventive device is characterized by any of the measurements described in the following Examples section. For example, in some preferred embodiments, the device possesses high energy density performance such that, when air at 20° C. is passed through cooling channels at a superficial velocity of 2100 cm/s and a feed containing 40.0 mol % water vapor in air enters gas flow channels at a superficial velocity of 630 cm/s, the energy density calculated from the volume of the sum of the volume of the cooling channel and the gas flow channel, including the volume of walls defining the cooling channel, is at least 1 W/cm$^3$, more preferably at least 4 W/cm$^3$, and in some embodiments between about 1 W/cm$^3$ and about 5 W/cm$^3$. Using the weight of material (of the same volume described above for energy density), the specific heat transfer power density is at least 1000 W/kg, more preferably at least 3000 W/kg, and in some embodiments between about 1000 W/kg and about 4000 W/kg. The heat flux and calculated overall mean heat transfer coefficient based on the primary heat transfer area (the area of the wall separating coolant flow path from gas flow channel) are at least 1 W/cm$^2$ and 500 W/cm$^2$·K, respectively, and more preferably at least 3 W/cm$^2$ and 800 W/cm$^2$·K, respectively. In some embodiments, the heat flux would be between about 1 W/cm$^2$ and 5 W/cm$^2$, with overall mean heat transfer coefficients between about 500 W/cm$^2$·K and 1000 W/cm$^2$·K. Furthermore, the decrease in pressure of the coolant stream would be preferably no more than 10 inches (25 cm) of water column, more preferably less than 4 inches (10 cm) of water column, and in some embodiments between 1 inch (2.5 cm) of water column and 5 inches (13 cm) of water column. In devices with multiple repeating units, these properties may be averaged over some or all of the repeating units. In some inventive embodiments, the temperature of the coolant entering the cooling channels is at least 15° C. The pressure decrease of the coolant stream should be measured from the beginning of the coolant flow path or paths that is adjacent to a gas flow channel or channels to the end of the coolant flow path or paths that is adjacent to a gas flow channel or channels. Similarly, the device can be characterized by any of the measured values (or at least 30% of the measured values, or from about 40% of the measured value to about 100% of the measured value). In view of the parameters described in these descriptions, skilled engineers can (through routine experimentation) optimize performance over that described in the Examples section.

EXAMPLES

Example 1

The microchannel condenser is a cross-flow, air-cooled heat exchanger with an integrated phase separator to collect and remove the condensate as a separate liquid stream from the device.

The device is an assembly of stacked components. An exploded-view schematic of the stack is shown in FIG. 1. On the bottom is a heat exchange element containing slots for cooling air flow. The separator element is placed on top of the heat exchange element with a gasket in between thereby forming flow channels for the condensing stream. A second gasket and condensing element is placed on top of the separator forming a second set of condensing channels. A mixture of vapor and non-condensable gas is fed into a header region at one end and distributed into an array of microchannels formed by the heat exchange element on one side and a wicking structure on the other. Air blowing cross-current through vertical slots in the heat exchange elements, cools the gas mixture and condenses the vapor flowing through the microchannels. The objective is to sorb the condensate into the adjacent wicking structure and preclude the build-up of a liquid film on the condensing surface that would add to heat transfer resistance. A premise of the design is that by operating the device in the appropriate flow regime (TeGrotenhuis and Stenkamp, 2001), the liquid can be effectively transported from the condensing surface to the wick without entrainment of liquid in the flowing gas leading to breakthrough of liquid to the gas outlet.

The phase separator located between the condensing microchannels is comprised of two wicking structures and a liquid flow channel. Condensate flows through the wicks to pore throat windows that permit liquid flow but preclude gas flow into a liquid collection channel. A tube connected to one end of the liquid channel allows condensate to be removed from the device.

The stack is compressed slightly within a housing to seal the condensing flow channels. The housing is connected to a blower to supply cooling air flow. Separate connections are also provided for hot stream feed, gas outlet flow, and a liquid condensate outlet. The heat exchange aspects are described first followed by a description of the integrated phase separator.

The heat exchange elements are aluminum and weigh 23.5 g. Cooling is provided by air flow through 142 slots that are 0.024 inch wide (0.61 mm) by 0.100 inch tall (2.5 mm) and 1.2 inches long (3.05 cm). The slots are separated by 0.010 inch wide (0.25 mm) walls that serve as heat exchange fins to enhance cooling side heat exchange. Calculated fin effectiveness is 99%. The cross-flow device is designed to operate with less than 10 inches of water column (2.5 kPa) pressure drop in the cooling air stream to facilitate the use of a fan or blower.

The flow channels for the condensing side of the heat exchanger are microchannels formed by the ridges located on top of the condensing element and the separator element stacked on top of the condensing element. The channels are 0.020 inches deep (0.5 mm) and 0.170 inch wide (4.3 mm) and 5.7 inches long (14.5 cm). There are five channels formed by each condensing element for a total of ten microchannels for condensing heat exchange. The ridges separating the condensing channels are structural and do not significantly enhance hot side heat exchange. The hot stream is introduced through a half-pipe tee into the inlet header at one end of the device and the uncondensed gas is collected in the header at the opposite and exits through a second half-pipe tee.

The wall separating the hot side from the cold side provides the primary heat exchange area and is 0.020 inch thick (0.5 mm). The total primary heat exchange area on the condensing side is 62.2 $cm^2$. The primary area on the cooling side of 44 $cm^2$ is enhanced to 410 $cm^2$ by the fins.

The phase separator is located between the two sets of condensing flow channels. A liquid flow channel is isolated from the condensing flow channels by pore throat material made of sintered stainless steel. The separator has three pore throat windows that are 1 inch by 0.5 inches (2.5 cm by 1.3 cm) on each side facing the condensing channels. The pore throat material is wetting for the condensate phase and allows condensate flow from the condensing channels to the liquid flow channel, which occurs by maintaining the liquid outlet at a lower pressure than the gas outlet. Gas intrusion through the pore throat into the liquid flow channel is precluded by capillary forces, thereby promoting phase separation. The pore throat is characterized by permeability and breakthrough pressure, the pressure difference where gas will displace liquid from the pore throat. The average measured permeability of the 0.0279 μm thick pore throat material in the separator is $6 \times 10^{-10}$ $cm^2$, and the breakthrough pressure is approximately 17 inches of water column (4.4 kPa).

Phase separation is further augmented by placing sorbent material (a cotton cloth purchased from a fabric store) over the surface of the phase separator adjacent to the condensing flow channels. The purpose of the sorbent material is to locally collect condensate from the flow channels and conduct the condensate to the pore throat windows where it flows through to the liquid flow channel and subsequently from the device.

Performance of the partial condenser and phase separator was tested on NASA's KC-135 reduced gravity aircraft. Testing occurred as the aircraft performs parabolic maneuvers every 1 to 1.5 minutes thereby achieving short periods of reduced gravity, typically at less than 0.04 g, lasting about 20 seconds. Parabolas were performed in sets of about 10 separated by one to three minute breaks as the aircraft turned around. Typically, 40 parabolas were performed during a given flight.

The coolant air flow was achieved by connecting the suction side of a small blower to the coolant discharge of the housing. A globe valve located between the condenser and the blower was used for modulating coolant air flow. The suction pressure at the inlet of the blower was measured relative to cabin pressure using a differential pressure transducer, and the air flow was determined from a blower curve derived for that specific machine. The temperature of the coolant air exiting the condenser was measured using a K-type thermocouple, as was the incoming coolant air.

A piston pump metered liquid water to a temperature controlled microchannel vaporizer to produce superheated steam that was then mixed with air flow from a mass flow controller. Additional heat was added after mixing using heat trace prior to entering the device. A K-type thermocouple was inserted into the header of the device to monitor the inlet temperature. A pressure transducer was used to measure the inlet pressure.

The temperature of the uncondensed gas stream was measured by a K-type thermocouple in the outlet header, and the pressure was measured by a transducer connected to a tee in the outlet piping by a water filled line. Similarly, the temperature and pressure of the water outlet flow were also monitored. Both the gas and liquid effluent streams passed through clear tubing located below a video camera to record breakthrough of liquid to the gas stream and gas to the liquid stream. Both streams subsequently passed through manually operated back pressure regulators that were used to regulate the pressure difference between the two streams. This allowed for modulation of the pressure difference across the pore throat.

Three-way solenoid valves were used downstream of the regulators to direct the gas and liquid flows between two collection vessels. Between reduced gravity experiments, both flows were directed to collection vessels. When the g-level dropped below a preset value, normally 0.2 g, a timer counted down from 2 seconds before the solenoids were activated to direct the flows to two sample jars. The sample jars each contained a preweighed piece of laminated sorbent material to collect water from the stream during the experiment. When the g-level exceeded 0.3 g, the solenoids were deactivated automatically to direct the flow back to the collection vessels. The samples were changed between experiments, stored in individual plastic bags, and weighed after the flights to obtain a measurement of the average water flow rate in each stream during the experiment.

In summary, phase separation efficacy was determined by visual observation during the experiments, review of video tape recordings of the outlet lines, and by water balance using the samples. Heat balances were also calculated for both the cold and hot streams using measured temperatures, pressures, and flow rates.

Results And Analysis

The condenser/separator was flown on four reduced gravity flights, but the first did not yield useful data because of operational difficulties. During the other three flights, data were collected at varying flow rates, inlet temperatures, and steam fraction of the hot feed stream. Phase separation efficacy was evaluated, and heat balance analyses resulted in assessment of heat exchanger performance, as described below.

Phase Separation

The objective of phase separation is to collect and remove all of the liquid condensate from the flowing gas stream, while also precluding the breakthrough of gas into the condensate outlet stream. Breakthrough of gas into the condensate stream rarely occurred during the reduced gravity experiments. As long as the difference in pressure between the inlet and the liquid outlet was maintained below the breakthrough pressure of 4.4 kPa, gas was not observed in the liquid effluent. In some experiments, gas breakthrough to the liquid stream did not occur even when the pressure difference exceeded the breakthrough pressure. Furthermore, when gas did breakthrough across the pore throat into the liquid stream, phase separation could be restored simply by modifying operating parameters, such as by slightly increasing the liquid outlet pressure.

Liquid breakthrough to the gas outlet occurred more frequently during the reduced gravity experiments, although complete separation of the liquid did occur at condensation rates as high as 10 mL/min at an air flow of 5 SLPM. When the air feed rate was increase to 11 SLPM, as much as 6 mL/min of condensate could be completely removed from the gas flow channels.

Pore throat flow capacity has been found to be an important parameter in the operation of microchannel phase separators (TeGrotenhuis and Stenkamp, 2001). Pore throat capacity is calculated from Darcy's equation as $$Q_{PT} = \frac{KA\Delta P}{\mu h} \quad (1)$$

where $Q_{PT}$ is the maximum flow of fluid having viscosity $\mu$ through area A of a porous media having permeability K and thickness h under an applied pressure drop of $\Delta P$. The pore throat capacity is calculated for a given experiment using an average of the pressure difference between the inlet and the liquid outlet and the pressure difference between the gas outlet and the liquid outlet.

The condensation rate is calculated by water balance. The amount of water vapor remaining in the gas stream assuming saturation at the outlet temperature and pressure is subtracted from the water feed rate to arrive at a condensation rate. The ratio of the condensation rate to the pore throat capacity is defined as the pore throat utilization. Past work in microchannel phase separators has found that the occurrence of liquid breakthrough is correlated to the pore throat utilization.

Figure 2:
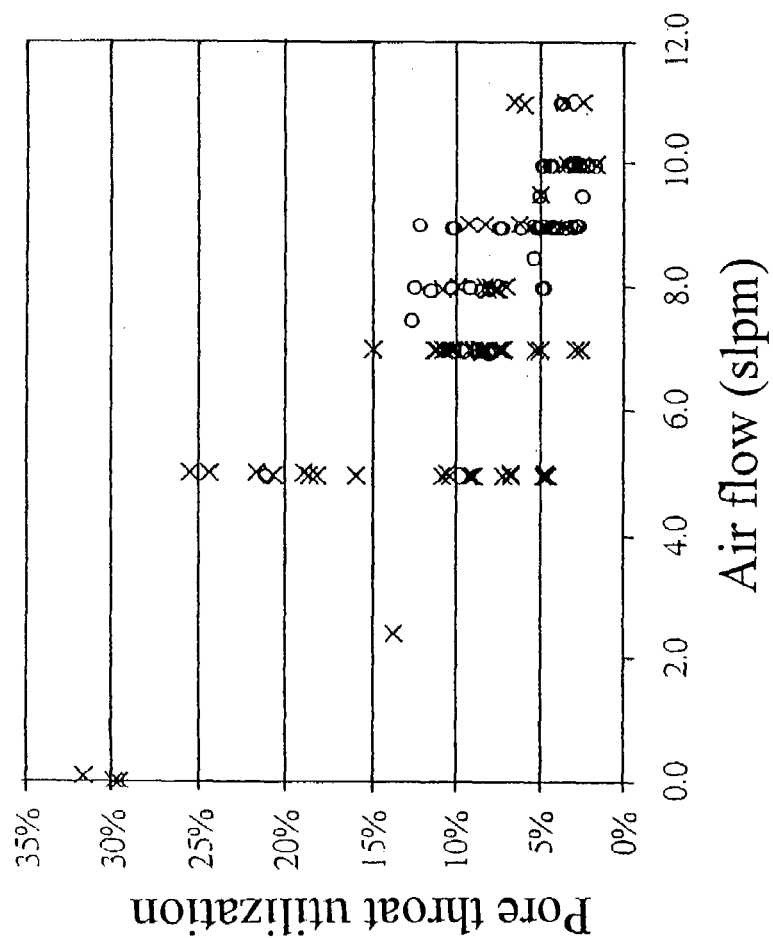
FIG. 2 is a compilation of results at varying condensing stream air flow rates and pore throat utilization in the device of Example 1 where liquid breakthrough occurred (○) and did not occur (x).

Compiled liquid breakthrough results are shown in FIG. 2 for all of the reduced gravity experiments. Typically, breakthrough of condensate did not occur when the air flow was 5 SLPM or below even as the pore throat utilization reached 25%. At the higher air flows up to 11 SLPM, liquid breakthrough was inconsistent and occurred even at pore utilization below 5%.

Figure 3:
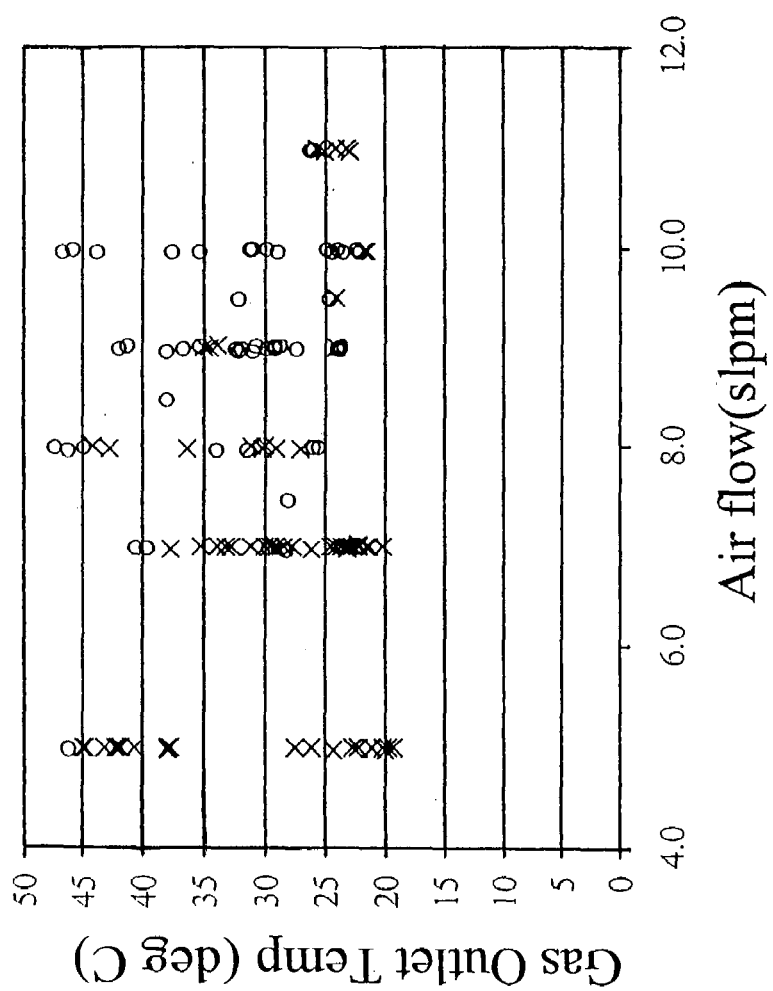
FIG. 3 is a compilation of results at varying condensing stream air flow rates and gas outlet temperatures in the device of Example 1 where liquid breakthrough occurred (○) and did not occur (x).

The amount of liquid detected in the gas stream samples was minimal at the lower air flows of 5 and 7 SLPM; the maximum being only 3% of the water feed. At 8 SLPM air flow, liquid measured in the gas samples reached 13% of the liquid feed, and above 8 SLPM, liquid breakthrough approached 40% of the water feed rate. Therefore, phase separation was very effective at the lower gas velocities, but became increasingly unstable at higher velocities. Liquid entrainment was also found to be sensitive to the gas outlet temperature as shown in FIG. 3. At a given air flow rate, the likelihood of liquid breakthrough to the gas outlet increased as the temperature of the effluent gas increased.

Heat Exchange

Heat exchange effectiveness is analyzed by performing heat balances on both the hot and cold streams. The amount of heat acquired by the cooling air stream is calculated from the temperature rise and the molar flow rate as determined from the blower curve using the pressure rise across the blower. The amount of heat transferred from the condensing stream is the sum of the latent heat of condensation and the sensible heat loss. The latent heat rate is calculated from the condensation rate, which is calculated as the difference between water feed rate and the water vapor remaining in the gas stream, assuming saturated air at the gas outlet temperature and pressure. The sensible beat loss is determined by cooling the condensate to the water and/or gas outlet temperatures plus cooling the outlet gas stream to the gas outlet temperature. The difference between the heat duty of the hot stream and the duty of the cooling stream is considered the ambient heat loss.

The condenser housing contributes a large thermal mass to the system, creating long temperature transients during start-up and when operating conditions are changed. Because the system cannot be operated during take-off of the aircraft, the limited duration of the flight, and the mandated frequency of experiments, the condenser was operated in only pseudo-steady-state mode. This is seen most clearly in the ambient heat loss trends. For example, the first four experiments of Flight 3 were conducted at the same operating conditions, including the same temperature and composition of the hot feed, but the ambient heat loss decreased from 83% of the hot stream heat duty to 61%, while the gas outlet temperature climbed from 20° C. to 30° C., indicating that much of the heat was being transferred to the housing instead of to the cooling stream. At other times, the ambient heat loss would become negative when the water feed rate was decreased, indicating that the housing was being cooled. The average calculated heat loss for all of the reduced gravity experiments was 30% of the cooling duty.

Figure 4:
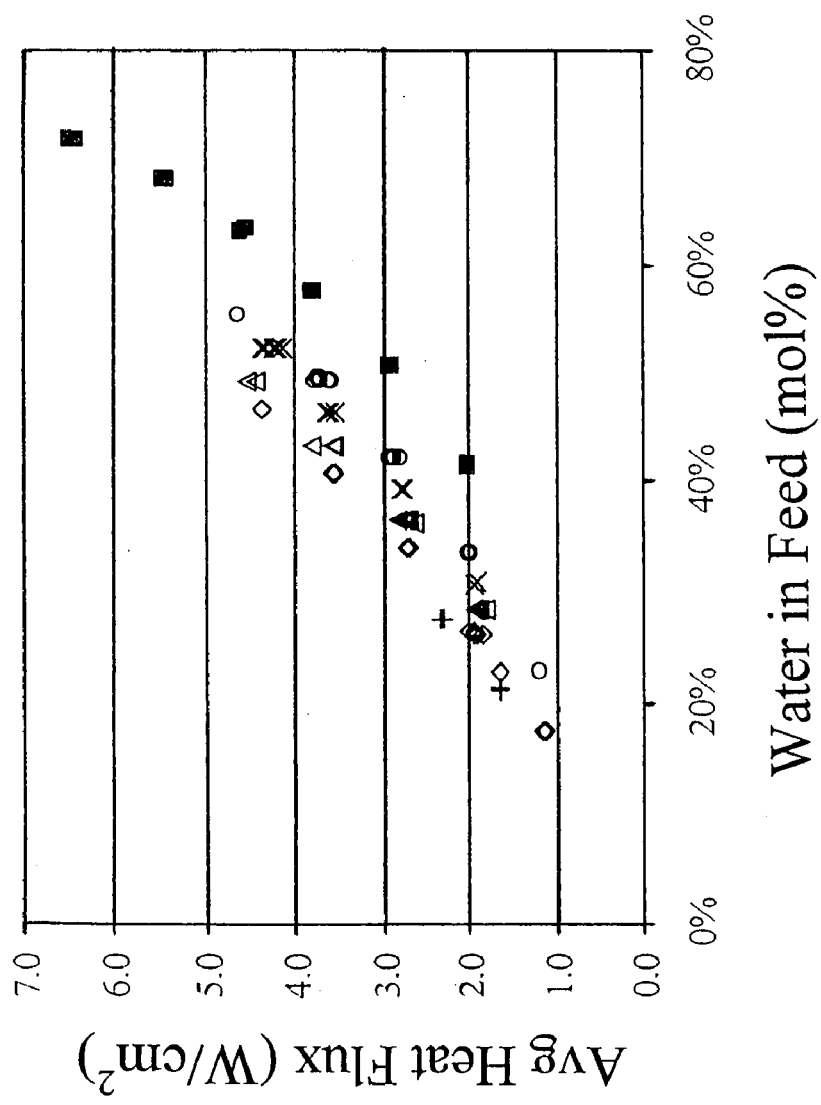
FIG. 4 is a plot of average heat flux versus percent water in the feed at condensing stream air flows of 11 SLPM (+), 10 SLPM (◇), 9 SLPM (Δ), 8 SLPM (x), 7 SLPM (○) and 5 SLPM (■), in the device of Example 1.

The heat transfer characteristics of the device were evaluated using the hot stream heat duty despite the long-time transients caused by the thermal mass of the housing. Average heat fluxes, calculated by dividing the hot stream heat duty by the primary heat exchange surface area, are plotted versus mol % water in the hot feed for several feed air flows in the condensing feed mixture as shown in FIG. 4. Average heat fluxes range from 1 up to almost 7 W/cm$^2$.

Figure 5:
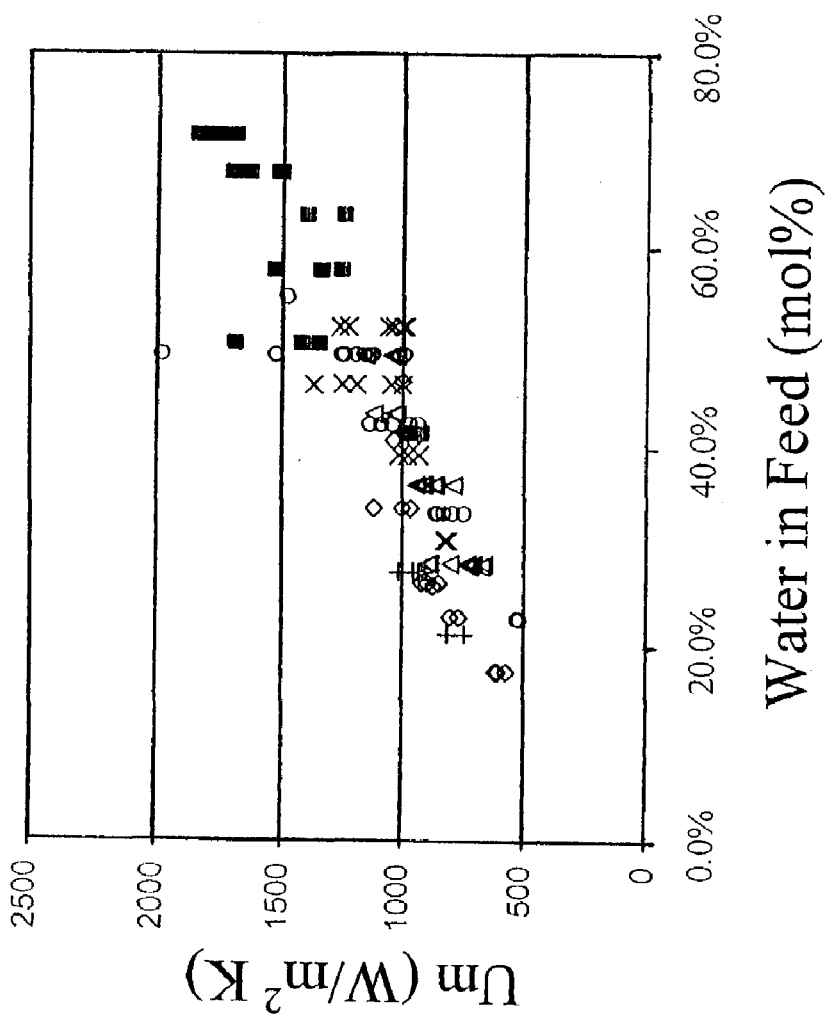
FIG. 5 is a plot of mean overall heat transfer coefficient versus percent water in the feed at condensing stream air flows of 11 SLPM (+), 10 SLPM (○), 9 SLPM (Δ), 8 SLPM (x), 7 SLPM (○) and 5 SLPM (■), in the device of Example 1.

The mean overall heat transfer coefficient, $U_m$, was calculated by dividing the average heat flux by the LMTD for cross-flow heat exchange using inlet and outlet gas temperatures. The mean overall heat transfer coefficient is found to be a function of the water content of the feed as seen in FIG. 5. This is expected for a partial condenser because the enthalpy of the condensing stream is not a linear function of temperature. Above the dew point, the slope is equal to the heat capacity of the gas stream. Below the dewpoint, a latent heat of condensation component dominates the enthalpy change, dramatically increasing the slope of enthalpy versus temperature. Furthermore, the slope is not constant below the dew point, because the condensation rate is a decreasing function of temperature.

Figure 6:
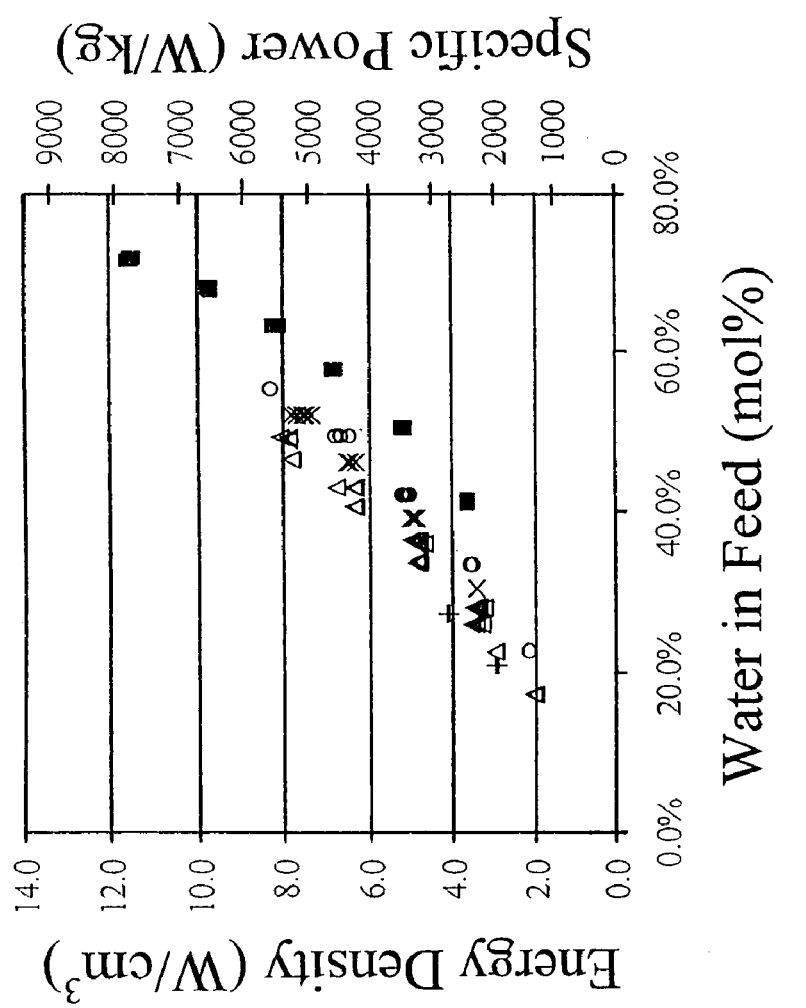
FIG. 6 is a plot of thermal energy density and specific power versus percent water in the feed at condensing stream air flows of 11 SLPM (+), 10 SLPM (○), 9 SLPM (Δ), 8 SLPM (x), 7 SLPM (○) and 5 SLPM (■), in the device of Example 1.

The heat transfer productivity of the device is shown in FIG. 6. Thermal energy density and specific power are calculated using the hot stream heat duty and the size and weight of the heat transfer components only—two of the condensing elements shown in FIG. 1 and gaskets. The volume of the two aluminum condensing elements is 35 cm$^3$, and the mass is 52 g. In the same way as the heat flux, the heat transfer energy density and specific power depend on the water content of the feed. The former ranges between 2 and 12 W/cm$^3$ and the latter between 1200 and 8000 W/kg. These values decrease if the separator is added to the size and weight, which has a volume of 24 cm$^3$ and a mass of 160 g. However, the separator was fabricated out of stainless steel, and the weight could be reduced to 50 g, if it was made of aluminum. Other lighter weight materials could also be used to reduce weight when aluminum would not be appropriate, such as in corrosive applications.

Discussion

Phase separation with the microchannel partial condenser performed well, particularly at the lower gas velocities. Feed air flow in the hot stream had the greatest impact on the occurrence of liquid breakthrough to the gas outlet. Condensation occurs on one side of the gas flow channels adjacent to the cooling channels, but is removed on the opposite side into the sorbent material and through the pore throat. This requires the condensate to migrate from the condensing side to sorbent side of the microchannels while gas is flowing down the channels. The result is the potential for liquid to be entrained or swept by the gas toward the gas outlet before it can be effectively absorbed. This potential increases with increasing gas flow.

Microchannel phase separation testing has shown a strong dependence on the pore throat flow capacity or pore throat utilization (TeGrotenhuis and Stenkamp, 2001). This dependence was not a significant factor in the results of these tests. Experiments were conducted with no liquid breakthrough at pore throat utilizations as high as 25%, while breakthrough did occur with pore utilization below 2%. Pore throat capacity did not appear to be a limitation in the performance of this device, indicating other physical processes limited liquid flow capacity, such as transport of condensate to the wicks and/or flow of condensate through the wicks to the pore throat windows.

On the other hand, the gas outlet temperature did seem to affect the occurrence of liquid breakthrough. Liquid was more likely to be found in the gas stream as the outlet temperature was increased. This is attributed to a higher condensation rate at the outlet end of the device. As the gas outlet temperature increases the temperature driving force increases, thereby increasing the heat flux. The higher heat flux near the outlet results in higher condensate production near the outlet. Furthermore, the amount of condensate produced per increment of temperature change decreases with decreasing temperature; less condensate is produced going from 30° C. to 25° C. than from 40° C. to 35° C. This also contributes to higher condensate production near the outlet as the gas outlet temperature increases. Producing more condensate near the gas outlet increases the challenge of removing the condensate from the gas flow before it exits the gas channel. Consequently, liquid breakthrough becomes more problematic as the gas outlet temperature increases.

The mean overall heat transfer coefficient for air-cooled partial condensation reached 500–2000 W/m$^2$ K. These values were achieved by creating a large extended surface area for air side heat exchange, obtaining a high fin effectiveness by using aluminum, and achieving a very small hydraulic diameter to increase the convective heat transfer coefficient on the coolant side. This resulted in heat transfer power densities exceeding 10 W/cm$^3$ and specific power over 5000 W/kg. The ability to achieve these levels of hardware productivity with gas heat exchangers has numerous applications where size and weight are critical.

Conclusions

A microchannel partial condenser with integrated phase separation has been successfully tested in reduced gravity aboard NASA's KC-135 aircraft. Mixtures of air and steam were fed at temperatures of 70–95° C. and cooled to less than 40° C. in an air-cooled cross-flow heat exchanger. The resulting condensate was successfully separated from the gas stream in the absence of gravitational forces over a range of operating conditions.

Breakthrough of the condensate to the gas outlet tended to occur at higher condensing stream flow rates and was also affected by the gas outlet temperature. The flow capacity of the separator was not a significant factor.

The air-side heat transfer resistance was reduced through the use of extended surfaces and by reducing the hydraulic diameter through the use of minichannels, resulting in heat transfer energy densities exceeding 10 W/cm$^3$ and specific powers over 5000 W/kg. This corresponded to heat fluxes approaching 7 W/cm$^2$.

The use of microchannels on both sides of the partial condensing heat exchanger offers a significant advantage for compact systems where size and weight are critical. Furthermore, the ability to integrate phase separation and operate independent of gravity is a significant capability, especially for space applications.

Example 2

A second example was also a cross-flow, air-cooled microchannel partial condenser. This device differed in that gravity was used to motivate fluid through wick structures to a pore throat structure located in the outlet gas header. This device was comprised of a stack of heat exchange elements, gas flow channels, and wick structures. The bottom of the stack is one of the heat exchange elements described in Example 1 and is shown at the bottom and top of the stack shown in FIG. 1. The top surface of the heat exchange element has five (5) channels that are 0.020 inch (0.05 cm) deep extending from one header to the other. A gasket was placed on top of the heat exchanger element that extends around the perimeter. A wick structure is placed within the gasket extending between the headers and substantially covering the five channels, thereby forming flow channels for the gas stream. The wick structure consists of a layer of Delker expanded metal screen, cotton cloth material, and a second layer of Delker screen, all sewn together to form an integral structure.

A second heat exchange element is placed on top of the first wick structure. This second heat exchange element is similar to the first except that the 0.020 inch (0.05 cm) deep channels are formed on both sides, and the cooling flow slots are 0.200 inch (0.51 cm) tall-twice as tall as the first heat exchange element giving twice the extended surface area for heat transfer. Another gasket and wick structure were placed on the second heat exchange element, followed by a third heat exchange element with dimensions the same as the second. A third gasket and wick structure are placed over the third heat exchange element. Finally, a fourth heat exchange element is placed on top of the third gasket and wick. The fourth heat exchange element has the same dimensions as the first, but is inverted. The completed stack has a total of four (4) heat exchange elements, three (3) wick structures, and six (6) arrays of parallel condensing flow channels. The order of components is as follows: cooling channel layer: gas flow channel wick structure: gas flow channel: cooling channel layer: gas flow channel: wick structure: gas flow channel: cooling channel layer: gas flow channel: wick structure gas flow channel: cooling channel layer: gas flow channel: wick structure: gas flow channel: cooling channel layer. The entire stack is placed in a housing and compressed to seal the condensing (gas) flow channels from the coolant channels.

This device was operated in a vertical orientation, with the gas inlet header located at the top and the gas outlet header located at the bottom. A pore throat structure is inserted into the outlet gas header. Condensate that forms during cooling of the gas stream is absorbed into the wick structures and flows downward through the wick structure and onto the pore throat structure. Various structures can be placed in the gas outlet header to allow gas to flow out of the device while preventing condensate entrainment. A liquid outlet is provided by a tube that penetrates the housing and the pore throat structure. The liquid outlet is maintained at a lower pressure than the gas outlet to remove condensate as a stream separate from the gas stream.

Figure 7:
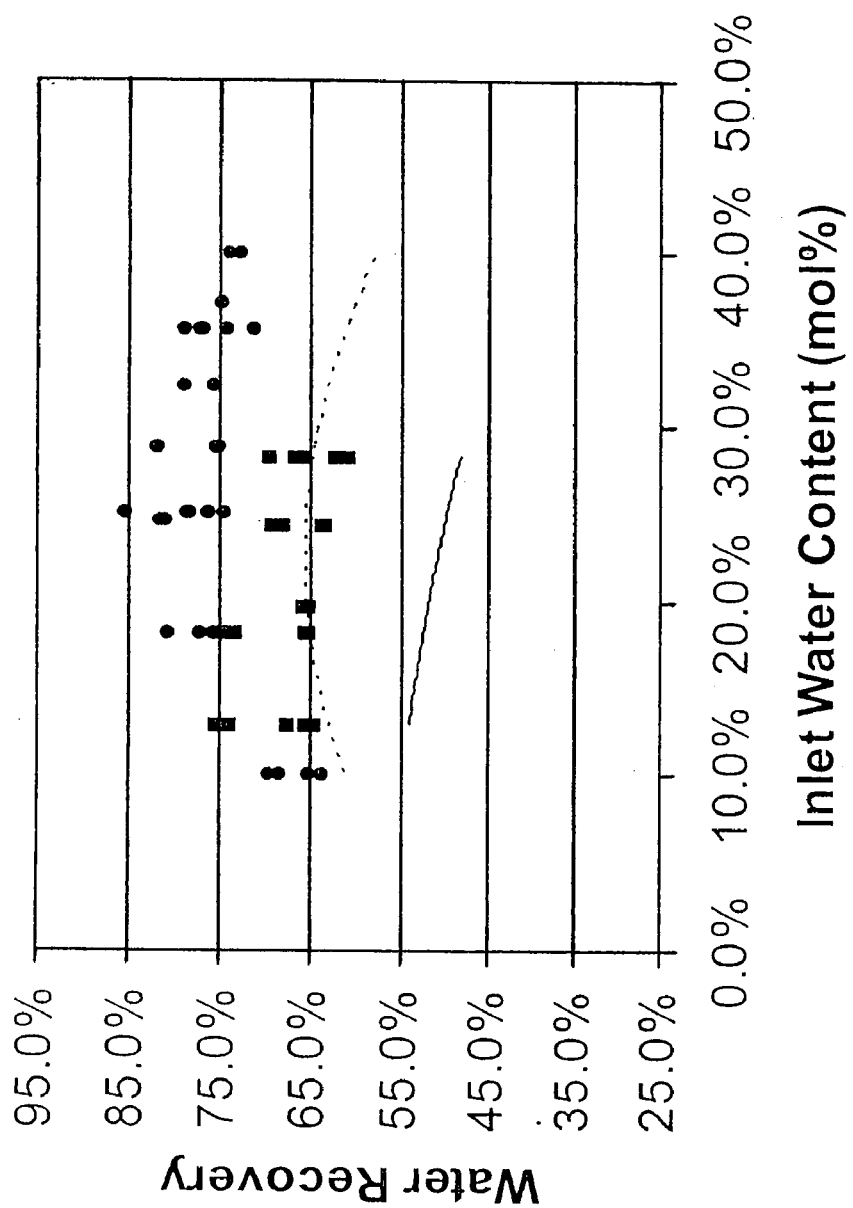
FIG. 7 is a plot of percent water recovered versus the water content of fluid entering the fluid inlet of the device of Example 2 at condensing stream air flows of 32 SLPM (●) and 48 SLPM (◇) with trendlines shown through the predicted performance values at the same operating conditions that produced the experimental data for both 32 SLPM air flow (- - -) and 48 SLPM air flow (—).
Figure 8:
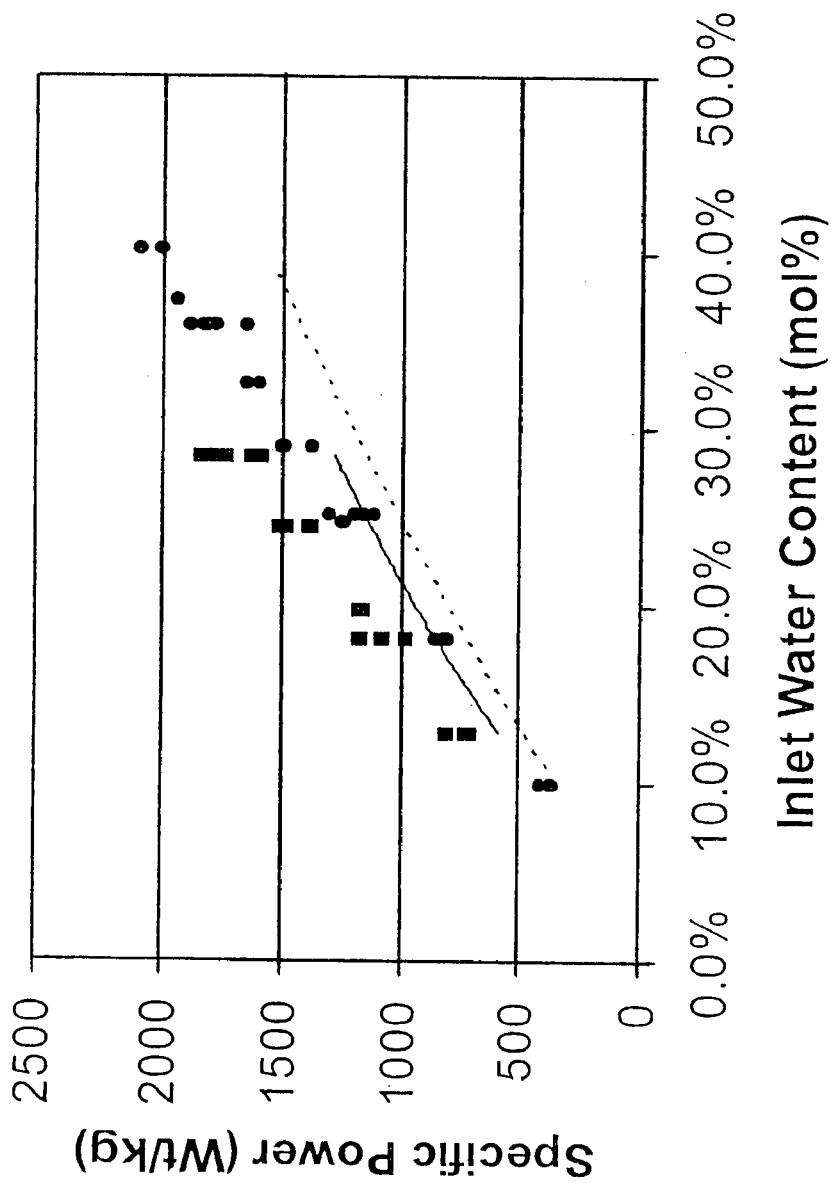
FIG. 8 is a plot of specific power versus the water content of fluid entering the fluid inlet of the device of Example 2 at condensing stream air flows of 32 SLPM (●) and 48 SLPM (■) with trendlines shown through the predicted performance values at the same operating conditions that produced the experimental data for both 32 SLPM air flow (- - -) and 48 SLPM air flow (—).
Figure 9:
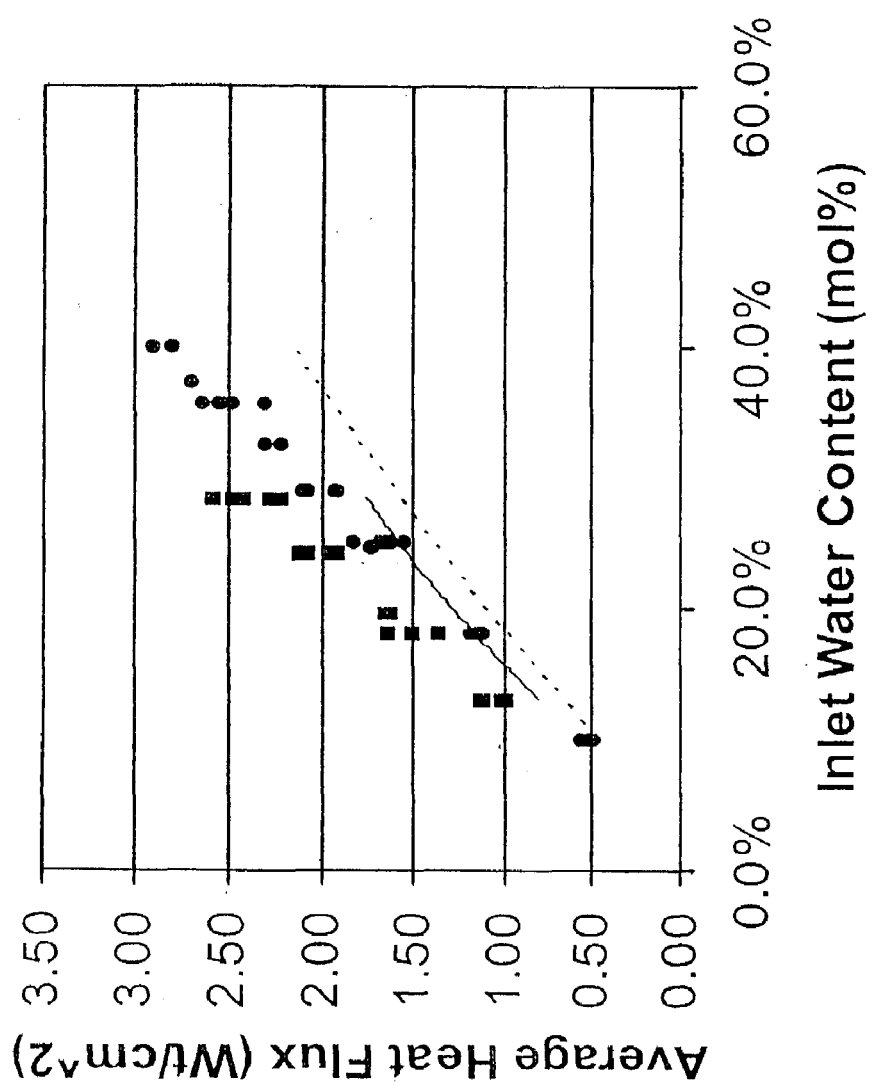
FIG. 9 is a plot of average heat flux versus the water content of fluid entering the fluid inlet of the device of Example 2 at condensing stream air flows of 32 SLPM (●) and 48 SLPM (■) with trendlines shown through the predicted performance values at the same operating conditions that produced the experimental data for both 32 SLPM air flow (- - -) and 48 SLPM air flow (—).

Measured performance of this device is shown in FIGS. 7, 8 and 9 at air feed flow rates of 32 and 48 standard liters per minute (SLPM) in the condensing stream. The experimental data for air flow of 32 SLPM ranged in operating conditions, with the coolant inlet temperature ranging from 19° C. to 25.5° C. and the coolant superficial velocity from 715–840 cm/s. The inlet temperature of the condensing stream ranged from 48° C. to 93° C., and the condensing stream superficial velocity at the entrance ranged between 900 and 1350 cm/s. The total heat transfer ranged between 100 and 540 Watts, the water recovery was between 64% and 85%, and the overall mean heat transfer coefficient ranged from 340 to 1000 Watt/$m^2$·K. At 48 SLPM air flow in the condensing stream, the coolant inlet temperature ranging from 19° C. to 25° C. and the coolant air superficial velocity was 730–840 cm/s. The inlet temperature of the condensing stream ranging from 56° C. to 87° C., and the condensing stream superficial velocity at the entrance ranged between 1400 and 1700 cm/s. The total heat transfer ranged between 180 and 480 Watts, the water recovery was between 61% and 76%, and the overall mean heat transfer coefficient ranged from 530 to 800 Watt/$m^2$·K.

In one experiment at 32 SLPM feed air flow, the coolant air was fed at 20° C. at a superficial velocity of 840 cm/s. The condensing stream entered at 77° C. at a superficial velocity of 1350 cm/s, and the condensing stream consisted of 40 mol % water. The gas stream exited at 55° C. with a pressure drop of 19 inches (48 cm) of water column representing 520 Watts of heat duty and 73% water condensation. The coolant also exited at 55° C. with a pressure drop of 2.1 inches (5.3 cm) of water column. The overall mean heat transfer coefficient was calculated as 990 Watts/$m^2$ ·K, achieving 2000 Watts/kg specific heat transfer power density and 3.1 Watts/$cm^2$ power density.

In a second experiment at 48 SLPM air flow, the coolant air was fed at 16° C. at a superficial velocity of 840 cm/s. The condensing stream entered at 84° C. at a superficial velocity of 1700 cm/s, and the condensing stream consisted of 28.5 mol % water. The gas stream exited at 48° C. with a pressure drop of 27 inches (69 cm) of water column representing 480 Watts of heat duty and 70% water condensation. The coolant also exited at 48° C. The overall mean heat transfer coefficient was calculated as 795 Watts/$m^2$·K, achieving 1800 Watts/kg specific heat transfer power density and 2.9 Watts/$cm^2$ power density.

A theoretical model of the example device was used to predict the performance at the operating conditions of each of the experimental data points shown in FIGS. 7, 8, and 9. Trendlines were obtained by a least squares fit of the theoretically predicted values to quadratic equations which are shown in FIGS. 7, 8, and 9 to illustrate that actual performance generally exceeded predicted performance. The theoretical model is a numerical integration of a local heat transfer model based on the Colburn-Hougen (1934) method that accounts for heat and mass transfer effects in the condensing stream. In addition, the model accounts for the air-side heat transfer resistance, wall resistance, and possible condensate film resistance. The eps-NTU method (Rohsenow, et al., 1998) is used for cross-flow heat exchanger with both streams unmixed and symmetric to determine the localized heat transfer effectiveness.

NOMENCLATURE
   A—pore throat area, $m^2$
   K—permeability, $m^2$
   h—pore throat thickness, m
   $Q_{PT}$—pore throat flow capacity, L/s
   $\Delta P$—applied pressure difference across pore throat, Pa
   µ—condensate viscosity, Poise

REFERENCES

Colburn, A. P. and O. A. Hougen, 1934, Design of Cooler Condensers for Mixtures of Vapors with Noncondensing Gasses, *Ind. Eng. Chem.*, Vol. 26, pp. 1178–1182.

Dean, W. C., 1991, Zero Gravity Phase Separator Technologies—Past, Present and Future, *SAE Tech. Paper Ser.* 911524, 21*st Int. Conf. on Env. Systems*, San Francisco, July.

Flynn, T. J., Privette, R. M., Perna, M. A., Kneidel, K. E., King, D. L., and Cooper, M., 1999, Compact Fuel Processor for Fuel Cell-Powered Vehicles, *SAE Tech. Paper Ser.*, 1999-01-0536, Detroit, Mich., March.

Kays, W. M., and London, A. L., 1984, *Compact Heat Exchangers*, 3rd ed., McGraw-Hill, New York.

Lange, K. E. and C. H. Lin, 1998, Advanced Life Support Program, Requirements Definition and Design Considerations, NASA CTSD-ADV-245 (REV A), NASA Johnson Space Center, Houston, Tex., January.

Rohsenow, W. M., J. P. Hartnett, Y. I. Cho, 1998, *Handbook of Heat Transfer*, $3^{rd}$ ed., McGraw-Hill, New York.

TeGrotenhuis, W. E. and Stenkamp, V. S., 2001, Normal Gravity Testing of a Microchannel Phase Separator for Insitu Resource Utilization, NASA/CR—2001-210955, NASA Glenn Research Center, Cleveland, Ohio, June.

Webb, R. L., 1994, *Principles of Enhanced Heat Transfer*, John Wiley & Sons, Inc., New York.

Wegeng, R. S., Pederson, L. R., TeGrotenhuis, W. E., and Whyatt, G. A., 2001, Compact Fuel Processors for Fuel Cell Powered Automobiles Based on Microchannel Technology, *Fuel Cells Bulletin* No. 28, ISSN 1464-2859, Elsevier Science Ltd., pp. 8–13.

We claim:

1. A condenser comprising the following elements in the order listed:
   a first cooling channel;
   a first gas flow channel adjacent to the first cooling channel;
   a liquid flow path comprising a wick;
   a second gas flow channel; and
   a second cooling channel adjacent to the second gas flow channel;
   wherein the liquid flow path comprises an open liquid flow channel sandwiched between a first wick and a second wick.

2. The condenser of claim 1 wherein the condenser is a laminated device and the first cooling channel, first gas flow channel, liquid flow path, second gas flow channel and second cooling channel are essentially planar.

3. The condenser of claim 1 further comprising a first pore throat disposed between the first gas flow channel and the liquid flow path, and a second pore throat disposed between the second gas flow channel and the liquid flow path.

4. The condenser of claim 1 further comprising the following elements in the order listed:
   a third gas flow channel adjacent to the second cooling channel;
   a second liquid flow path comprising a wick;
   a fourth gas flow channel; and
   a third cooling channel adjacent to the fourth gas flow channel.

5. The condenser of claim 4, wherein the condenser is a laminated device, further comprising:
   a fluid inlet connected to a header, wherein the header is connected to the first, second, third and fourth gas flow channels;
   a gas outlet connected to a footer, wherein the footer is connected to the first, second, third and fourth gas flow channels; and
   a liquid outlet connected to the liquid flow paths.

6. The condenser of claim 4, comprising:
   at least one fluid inlet connected to the first, second, third and fourth gas flow channels, and at least one gas outlet connected to the first, second, third and fourth gas flow channels;
   wherein a fluid can enter the condenser through the at least one fluid inlet, pass through a gas flow channel, and exit the condenser through the at least one gas outlet, all without passing through a wick.

7. The condenser of claim 1, comprising:
   a fluid inlet connected to the first gas flow channel, and a gas outlet connected to the first gas flow channel such that a fluid can enter the condenser through the one fluid inlet, pass through the first gas flow channel, and exit the condenser through the gas outlet, without passing through a wick;
   wherein the first gas flow channel has a first length;
   wherein the first cooling channel comprises coolant flow path that is adjacent to the first gas flow channel, wherein a portion of the first gas flow channel is closer to the gas outlet by at least 10% of the first length than is any portion of the coolant flow path; and
   wherein a portion of the first wick is closer to the gas outlet than is any area of the first cooling channel containing a coolant flow path.

8. The condenser of claim 1 wherein a fluid comprising at least two components flows into the device through a fluid inlet at a first temperature;
   wherein the fluid inlet connects to the first gas flow channel;
   wherein the first gas flow channel comprises a gas;
   wherein the first wick comprises a liquid;
   wherein the first cooling channel comprises a coolant at a second temperature; and
   wherein the second temperature is less than the first temperature.

9. The condenser of claim 1 wherein the device possesses high energy density steady-state performance such that, when ambient air at 20° C. is passed through the cooling channel at a superficial velocity of 840 cm/s and a feed stream containing 40.0 mol % water vapor in air is passed through the gas flow channel at a superficial velocity of 1700 cm/s at the entrance, the decrease in pressure of the ambient air stream through the cooling channel is no more than 4 inches (10 cm) of water column, and
   wherein the first cooling channel is defined by cooling channel walls; and
   wherein the energy density calculated from the volume of the sum of the first cooling channel and the first gas flow channel, including the volume of walls defining the first cooling channel, is at least 2.0 W/cm$^3$; and
   wherein at least 50% of the water vapor in the feed stream condenses into a liquid that flows into the liquid flow path.

10. The condenser of claim 1 wherein the first gas channel is a microchannel.

11. The condenser of claim 1 wherein the first wick has capillary pore sizes in the range of 100 nm to 0.1 mm.

12. A process of separating fluids, comprising:
    passing a fluid mixture into the first gas flow channel of the condenser of claim 1.

13. A system comprising a fuel cell comprising an outlet that is connected to the condenser of claim 1.

14. The condenser of claim 8 wherein the coolant is being moved by a blower or fan connected to the cooling channel.

15. A gravity independent system comprising the condenser of claim 2.

16. The condenser of claim 1 wherein the first wick and the second wick each have a thickness of less than 500 μm.

17. The condenser of claim 9 wherein the first wick and the second wick each have a thickness of less than 500 μm.

18. The condenser of claim 1 wherein the first wick and the second wick each have a thickness of between 50 and 150 μm.

19. The condenser of claim 9 wherein the first wick and the second wick each have a thickness of between 50 and 150 μm.

20. The condenser of claim 1 wherein a wall separates the first cooling channel from the first gas flow channel;
wherein the wall constitutes a primary heat transfer surface; and
further wherein a transport structure extends from the liquid flow path into the gas flow channel to either the primary heat transfer surface or near to the heat transfer surface such that a liquid condensed on the primary heat transfer surface can flow along the structure into the liquid flow path.

21. A process of separating fluids, comprising:
passing a fluid mixture into the first gas flow channel of a condenser comprising the following elements in the order listed:
a first cooling channel;
a first gas flow channel adjacent to the first cooling channel;
a liquid flow path comprising a wick;
a second gas flow channel; and
a second cooling channel adjacent to the second gas flow channel; wherein the condenser comprises a liquid outlet and a gas outlet;
wherein the fluid mixture comprises a first component that is a liquid in the wick and a second component that substantially remains a gas during the process;
wherein conditions during the process are such that the ratio of the gas to liquid Reynolds numbers, $Re_{GS}/Re_{LS}$, is greater than about $(4500) \cdot (Su)^{-0.67}$;
removing the first component through the liquid outlet; and
removing the second component through the gas outlet.

22. The process of claim 21 wherein the ratio of the gas to liquid Reynolds numbers, $Re_{GS}/Re_{LS}$, is in the range of $(4600 \text{ to } 100,000) \cdot (Su)^{-0.67}$ with the liquid Reynolds number based on condensation rate.

23. The process of claim 21 wherein the fluid mixture consists essentially of 2 components.

24. The process of claim 23, wherein one of the components comprises liquid water.

25. The process of claim 21 wherein a wall separates the first cooling channel from the first gas flow channel;
wherein the wall constitutes a primary heat transfer surface; and
further wherein a transport structure extends from the liquid flow path into the gas flow channel to either the primary heat transfer surface or near to the heat transfer surface such that a liquid condensed on the primary heat transfer surface can flow along the structure into the liquid flow path.

26. A condenser, comprising:
a cooling channel;
a gas flow channel adjacent to the cooling channel; and
a liquid flow path comprising a wick; wherein the liquid flow path is adjacent to the gas flow channel;
wherein the cooling channel is defined by cooling channel walls;
a primary heat transfer surface between the gas flow channel and the cooling channel, wherein this surface has an area;
wherein the device possesses high energy density steady-state performance such that, when ambient air at 20° C. is passed through the cooling channel at a superficial velocity of 840 cm/s and a feed stream containing 40.0 mol % water vapor in air is passed through the gas flow channel at a superficial velocity of 1700 cm/s at an entrance of the gas flow channel, the decrease in pressure of the ambient air stream through the cooling channel is no more than 4 inches (10 cm) of water column, and at least one of the following:
(1) the energy density calculated from the volume of the sum of the cooling channel and the gas flow channel, including the volume of walls defining the cooling channel, is at least 2.0 W/cm$^3$,
or (2) the specific energy, calculated from the weight of materials defining the cooling channel and the gas flow channel, is at least 1000 W/kg,
or (3) the overall mean heat transfer coefficient is at least 500 W/cm$^2$·K based on the area of the primary heat transfer surface between the gas flow channel and the cooling channel,
or (4) at least 70% of the water vapor in the feed stream condenses into a liquid.

27. The condenser of claim 26 wherein the condenser is a laminated device wherein the liquid flow path and the gas flow channel are substantially planar; and
the liquid flow path and the cooling channel are disposed on opposing sides of the gas flow channel.

28. The condenser of claim 27 wherein the gas flow channel is a microchannel and the cooling channel is a microchannel.

29. The condenser of claim 27, further comprising:
a second gas flow path disposed on a side of the liquid flow path that is opposite a side of the liquid flow path that is adjacent to the gas flow channel; and
a second cooling channel, wherein the second cooling channel is adjacent to the second gas flow path.

30. The condenser of claim 27 wherein the energy density calculated from the volume of the sum of the cooling channel and the gas flow channel, including the volume of walls defining the cooling channel, is at least 2.0 W/cm$^3$; and
wherein at least 50% of the water vapor in the feed stream condenses into a liquid that flows into the liquid flow path.

31. The condenser of claim 30 comprising the structure recited in claim 2.

32. The condenser of claim 26 wherein a transport structure extends from the liquid flow path into the gas flow channel to either the primary heat transfer surface or near to the heat transfer surface such that a liquid condensed on the primary heat transfer surface can flow along the structure into the liquid flow path.

* * * * *